(No Model.)
F. J. HERRICK.
ATTACHMENT FOR HAMMOCK ROPES.
No. 495,200. Patented Apr. 11, 1893.
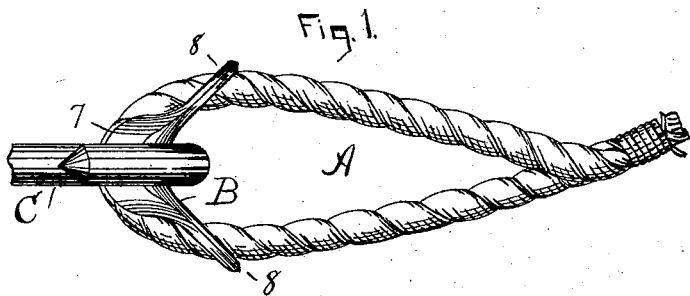
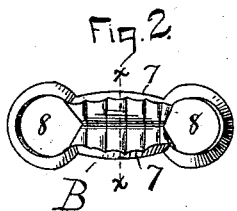
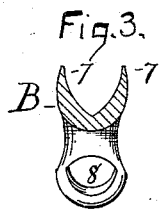
Witnesses.
Brayton S. Lewis.
C. Darwin Loomis Jr.
Inventor.
Frank J. Herrick
By James Shepard.
Atty.

UNITED STATES PATENT OFFICE.

FRANK J. HERRICK, OF NEW BRITAIN, CONNECTICUT, ASSIGNOR TO THE NORTH & JUDD MANUFACTURING COMPANY, OF SAME PLACE.

ATTACHMENT FOR HAMMOCK-ROPES.

SPECIFICATION forming part of Letters Patent No. 495,200, dated April 11, 1893.

Application filed June 27, 1892. Serial No. 438,074. (No model.)

*To all whom it may concern:*

Be it known that I, FRANK J. HERRICK, a citizen of the United States, residing at New Britain, in the county of Hartford and State of Connecticut, have invented certain new Attachments for Hammock-Ropes, of which the following is a specification.

My invention relates to improvements in attachments for hammock ropes, and the objects of my improvement are simplicity and cheapness of construction and general convenience and efficiency of the article.

In the accompanying drawings, Figure 1 is a side elevation of my attachment for the loop or hook end of the rope together with the loop and a portion of a hook supporting the same. Fig. 2 is a detached side view of said loop attachment as viewed from the outer end. Fig. 3 is a transverse section thereof on the line $x\,x$ of Fig. 2.

A designates the loop in the end of the rope with my loop attachment B properly placed thereon and supported by the hook C. This loop attachment consists of a curved body portion having flanges 7 on each side, preferably serrated or ribbed on the confronting sides which form a recess to receive the rope at the end of the loop A as shown in Fig. 1. Each end of this body portion is provided with rope eyes 8 which extend obliquely outward from the opposite ends of said body, said eyes being designed to receive the rope on the two sides of the loop as shown in Fig. 1 the rope having been passed endwise through said eyes before the loop A was tied.

The rope eyes 8 are in the form of rings when viewed in side view, and in edge view they extend tangentially from the curved body at such a degree of obliquity as to cross the rope within them as shown in Fig. 1.

This loop attachment is simple and cheap, is conveniently applied and when applied will securely remain in place and relieve the loop from wear.

I claim as my invention—

In hammock attachments, the attachment for the loop end of the rope consisting of the curved body portion having flanges 7. 7. on each side with the rope eyes 8. 8. extending tangentially across the rope from each end of said body substantially as described and for the purpose specified.

FRANK J. HERRICK.

Witnesses:
J. H. FRANCIS,
JAMES SHEPARD.